United States Patent [19]

Ecton

[11] Patent Number: 4,562,427
[45] Date of Patent: Dec. 31, 1985

[54] SYSTEM AND METHOD FOR STABILIZING ASYNCHRONOUS STATE MACHINES

[75] Inventor: William W. Ecton, Augusta, Kans.

[73] Assignee: NCR Corporation, Dayton, Ohio

[21] Appl. No.: 461,905

[22] Filed: Jan. 28, 1983

[51] Int. Cl.$^4$ ..................... H04Q 9/00; H03K 19/173
[52] U.S. Cl. ........................... 340/825.5; 340/825.87; 307/465
[58] Field of Search ................ 340/825.5, 825.87; 307/440, 445, 463, 465, 303, 247 R; 364/716

[56] References Cited

U.S. PATENT DOCUMENTS

| | | | |
|---|---|---|---|
| 4,162,535 | 7/1979 | Anderson | 340/825.87 |
| 4,336,468 | 6/1982 | Spillman | 307/440 |
| 4,366,393 | 12/1982 | Kasuya | 307/445 |
| 4,422,072 | 12/1983 | Cavlan | 340/825.87 |
| 4,431,928 | 2/1984 | Skokan | 307/465 |

OTHER PUBLICATIONS

*Proceeding of the IEEE*, vol. 65, No. 8, Aug. 1977 (N.Y. U.S.) W. Clin: "Microprocessor-Based Digital System Design Fundamentals and the Development Laboratory for Hardware Designers and Engineering Executives", pp. 1138–1161.

*IEEE Computer Technology*, Status, Limits, Alternatives; Digest of Papers from Compcom, Computer Society International Conference, Conf. 16, 1978 (N.Y. U.S.) J. Birkner: "Microprogramming Random Logic", pp. 75–80.

*Primary Examiner*—Donald J. Yusko
*Attorney, Agent, or Firm*—J. T. Cavender; Edward Dugas; Donald P. Gillette

[57] ABSTRACT

To prevent a race in an asynchronous state machine branching from one state to either of two others, depending on which of two control signals arrives first, one of the signals is latched in the state just ahead of the branching state. The branching then takes place in the branching state upon arrival of the other signal but in a direction determined by the value of the latched signal. If the latched value indicates a wrong order of arrival, the machine releases the original latched value and latches an updated value of the one signal and returns to the branching state. The looping, with unlatching and relatching, continues until the latched value causes branching to take place in the proper direction.

7 Claims, 10 Drawing Figures

FIG.5A

| $Y_2Y_1$ $Y_0$ | 00 | 01 | 11 | 10 |
|---|---|---|---|---|
| 0 | 31 | | | 36 |
| 1 | 32 ACK | 33 CD | 34 DR | 35 P / P̄ |

TR →, ACK →, CD →, DR →, P →, P̄ →

FIG.5C

| $Y_2Y_1$ $Y_0$ | 00 | 01 | 11 | 10 |
|---|---|---|---|---|
| 0 | 31 | | | 36 |
| 1 | 32 ACK | 33 (1) | 34 DR | 35 |

$Y_1 = \bar{Y}_2 Y_0 \text{ACK} + Y_1 Y_0 \text{DR} + \bar{Y}_2 Y_1 Y_0$

FIG.5B

| $Y_2Y_1$ $Y_0$ | 00 | 01 | 11 | 10 |
|---|---|---|---|---|
| 0 | 31 TR | | | 36 |
| 1 | 32 (1) | 33 (1) | 34 (1) | 35 ACK / P·ACK |

$Y_0 = \bar{Y}_2 \bar{Y}_1 \text{TR} + \bar{Y}_2 Y_0 + Y_1 Y_0 + Y_0 \text{ACK} + Y_0 \bar{P} \cdot \overline{\text{ACK}}$

FIG.5D

| $Y_2Y_1$ $Y_0$ | 00 | 01 | 11 | 10 |
|---|---|---|---|---|
| 0 | 31 | | | 36 |
| 1 | 32 | 33 CD | 34 (1) | 35 ACK / P·ACK |

$Y_2 = Y_1 Y_0 \text{CD} + \bar{Y}_2 Y_0 + Y_2 Y_0 \bar{P} \cdot \overline{\text{ACK}} + Y_2 Y_0 \text{ACK} + Y_2 Y_1 Y_0$

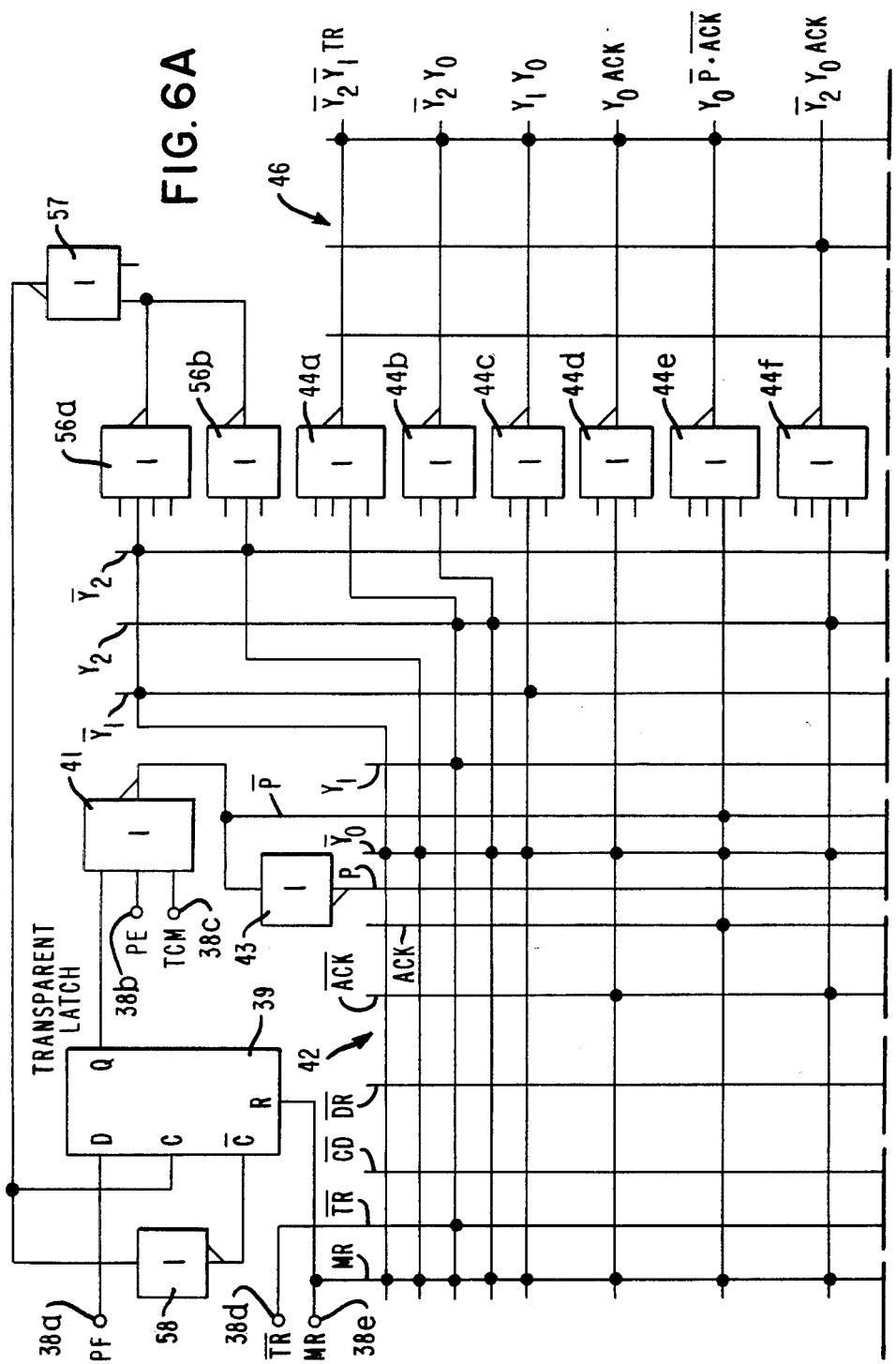

SYSTEM AND METHOD FOR STABILIZING ASYNCHRONOUS STATE MACHINES

BACKGROUND OF THE INVENTION

1. Field of the Invention

This invention relates to the stabilization of asynchronous state machines, especially those in which the operation passes from state to state as the result of being actuated by a series of signals that are not synchronous with each other and may occur so nearly simultaneously as to cause the machine to follow an improper sequence of progression.

2. The Prior Art

Some computing systems operate on the basis of having information transmitted by signals that are synchronized with each other, and specific amounts of time are allocated to the performance of each operating step or task. However, some steps or tasks can be completed much more rapidly than others, but in synchronous systems, the time required to perform the slowest step or task is the minimum time that must be allocated for all others synchronous with the slowest.

By allowing various parts of the system to complete their steps or tasks as quickly as possible and allowing them to operate asynchronously with respect to other parts, even closely related ones, the overall speed of operation can be increased.

The present invention was conceived in response to the need to speed up operation of a certain synchronous system, and the new concept successfully allows asynchronous operation that is about three times as fast as it would be if the operation had to be controlled on a synchronous basis.

One of the principal dangers in asynchronous operation is that two or more signals that should arrive at a given point in the system at different times will occasionally arrive so nearly simultaneously as to constitute a misleading result. Digital signals have two different values, commonly referred to as a 1 and a 0, and digital circuits normally respond to each value of an input signal in a specific way. Although digital signals are frequently described as if the time for such signals to shift from one of the values to the other were instantaneous, that is not an accurate description. A finite, though small, time is required for the signal to stabilize in its new value, and if another signal arrives with an overlapping transition time, the circuit that is supposed to respond in a certain way to one of the signals may not do so. The condition of having two signals contend with each other for control of a digital system or part of such a system on the basis of which signal arrives first is known as a race condition.

OBJECTS AND SUMMARY OF THE INVENTION

One of the objects of this invention is to allow a digital signal processing system to operate asynchronously at a significantly higher speed than if it were restricted to synchronous operation and yet to do so with improved safety against races.

Another object is to control a potentially contending signal so that it will be in one of its stable conditions and not in a transitional condition at the time it is applied to control a change of state.

To those skilled in the art, other objects will become apparent from studying the following specification together with the drawings.

In accordance with the invention, at least one of the signals used to control a change of state in an asynchronous state machine is applied to latching means to hold that signal stable until the proper time for it to be used. For example, in a system in which operation can branch from a certain state to any one of several others, a holding state is provided ahead of the branching state to hold the signal that controls the direction of branching. That signal is held until the proper conditions are established for its use, and then the held signal will be released.

The signal to be held may be retained in a transparent latch, which is a circuit that either holds the signal fixed in one of its two stable values, when the latch is subjected to a control signal of one polarity, or allows the signal to pass through, essentially without interference, when the latch is subjected to a control signal of the opposite polarity. The control, or holding, signal is derived from a combinational logic circuit to which the digital signals that control state sequencing of the system are applied. The output signal of the latching circuit is one of those signals.

The logic circuit includes a first set of gate circuits to which the digital signals are applied in groups determined by the sequence of states to be selected. Output terminals of the first set of gates are connected to input terminals of a second set that provide state-determining signals at their output terminals. The latter output terminals are connected back in selected order to appropriate input terminals of the first set as part of the state-selecting conditions. In addition, the state output terminals are applied to further logic means to derive the holding signal to control the latching means during proper states of the sequence.

The invention may be considered to be a stabilization system for a state machine, said stabilization system comprising a combinational decision logic system comprising a plurality of digital signal input terminal means to receive digital signals, a plurality of feedback signal input terminals, a plurality of feedback output terminals for feedback output signals representing a present state, a plurality of signal output terminals, and holding signal output means; first circuit means operatively connecting the feedback output terminals to the feedback signal input terminals to feed back present state information; latching means to receive a selected digital signal; second circuit means operatively connecting the latching means to the digital signal input terminal means; and third circuit means operatively connecting the holding signal output means to the latching means to control the latching means to transmit the selected digital signal to the combinational circuit operatively only under predetermined state conditions.

The invention may also be considered as a method of controlling the state sequence of a state machine under potential race conditions due to multiple possible branches from a predetermined state, said method comprising the steps of holding an input signal to the predetermined state in a holding state and determining whether any of the branches from the predetermined state are in condition to allow transmission of a signal thereto; transmitting the input signal to a branch in condition to allow such transmission; if no branch is in such condition, transmitting the input signal along a loop path to a follow state; transmitting the output signal of the follow state farther along the loop path to the holding state only after the holding state is in condition to receive it; and continuing around the loop from the holding state to the predetermined state to the follow state until one of the branches is in condition to allow transmission of the looped signal thereto.

BRIEF DESCRIPTION OF THE DRAWINGS

FIGS. 5A–5D are a series of Karnaugh maps corresponding to the state diagram in FIG. 4.

FIGS. 6A and 6B show one embodiment of a combinational logic circuit and latching circuit corresponding to the state diagram of FIG. 4.

DETAILED DESCRIPTION OF THE INVENTION

Figure 1:
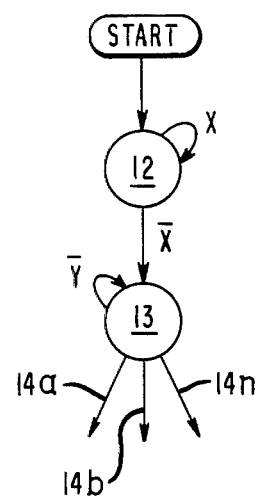
FIG. 1 is a state diagram that contains a potential race condition.

The state diagram in FIG. 1 is only part of a diagram for a complete, asynchronous state machine, or system, but it is a part in which a race may occur, depending on the relative timing of input signals. The machine is assumed to have a starting state 11. A first input signal causes the machine to shift to state 12, where it remains as long as a signal X is true. When that signal reverses polarity so that signal, or condition, $\overline{X}$ is true, the machine shifts to condition 13, where it remains as long as signal $\overline{Y}$ is true. From condition 13, the machine may follow any one of two or more branches, 14a–14n, depending on the relationship between signals that control the machine at this point, and this relationship varies due to the asynchronous nature of the controlling signals. Thus a potential race between two or more of the signals exists at this point.

Figure 2:
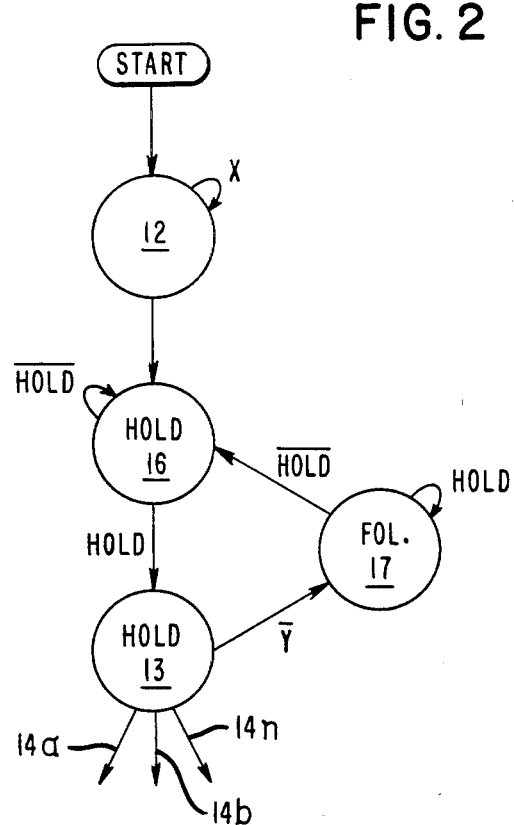
FIG. 2 is a state diagram that contains a holding state according to this invention.

FIG. 2 shows the simple way the state diagram of FIG. 1 can be modified to obtain the benefits of this invention. Between the states 12 and 13 is a holding state 16 that holds the input signal $\overline{X}$ stable. The machine loops on the holding state 16 as long as a HOLD signal is false, that is, as long as the converse signal, $\overline{\text{HOLD}}$, is true. The HOLD signal becomes true when the input signal becomes stable at the output, thus automatically compensating for propagation delays and making the state machine independent of the particular components of which it is constructed.

The input signal to the state 13 remains in the HOLD condition in that state, and, if none of the branches are TRUE, that is, ready to accept a signal from the state 13, the machine branches to a FOLLOW state 17, which allows the latching means that controls the state 16 to respond to a current signal $\overline{X}$, which may not have the same binary value as the signal that was previously latched. The latching means latches the current, or updated, signal $\overline{X}$.

In the FOLLOW state 17, component propagation delays would again be compensated for automatically by not allowing the state machine to proceed to the HOLD state 16 until the HOLD signal (which may more accurately be considered as the HOLD INPUT SIGNAL STABLE signal) becomes false. This is equivalent to having the $\overline{\text{HOLD}}$ signal become true. When that happens, the machine jumps to the state 16, allowing the loop path around the states 16, 13, and 17 to repeat until one of the branches 14 is true. The machine then proceeds to that branch state. Only the states 16, 13, and 17 are necessary to form the SAMPLE-FOLLOW-HOLD loop.

Figure 3:
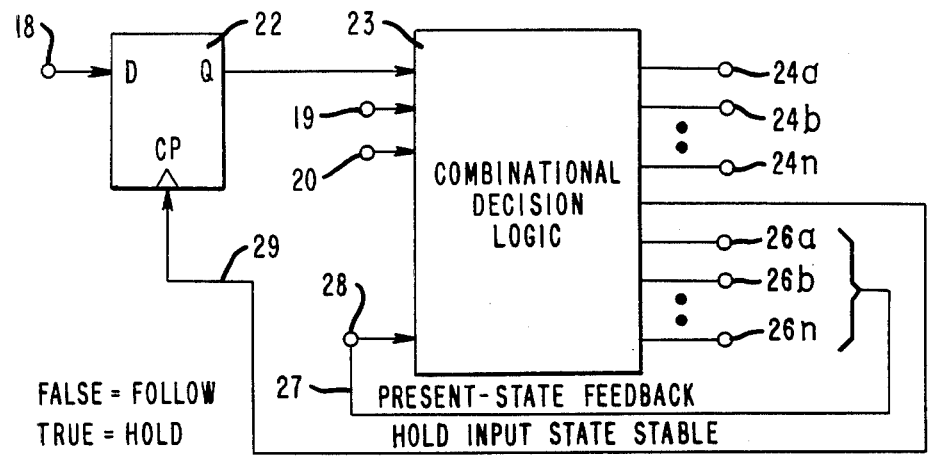
FIG. 3 is a simplified block diagram of an asynchronous system arranged according to this invention.

FIG. 3 shows a circuit capable of performing the sequence just described. This circuit includes several input terminals 18–20 to receive digital signals that control the transitions of the circuit form state to state. The input terminal 18 receives a signal that is likely to become involved in a race, and this terminal is connected to the data input terminal of a transparent latch circuit 22. A transparent latch is a type of flip-flop circuit that allows digital signals applied to its data input terminal to proceed to its output terminal (here identified by the letter Q), essentially without modification as long as a control signal of a certain polarity is applied as a HOLD signal to a control terminal CP. When the HOLD signal reverses polarity, the input signal is latched at the one of its two binary values that it happens to have when the HOLD signal becomes effective.

The circuit includes a combinational decision logic circuit 23 for which the terminals 19 and 20 and the Q terminal of the transparent latch circuit 22 serve as input terminals. The combinational decision logic circuit 23 includes output terminals 24a–24n and feedback signal output terminals 26a–26n. The latter are connected by a multiconductor bus 27 to feedback input terminals 28 (illustrated in this simplified representation as just a single terminal). A further output terminal 29 is connected to the control signal input terminal CP of the latching circuit means 22.

Signals applied to the input terminals 18–20, together with feedback circuits from the feedback output terminals 26a–26n effect state transitions in the logic circuit 23. In fact, the conditions at the feedback output terminals 26a–26n correspond to the state of the system and are, therefore, called PRESENT STATE feedback signals.

The combinational logic circuit and the way in which its input and feedback signals control the states are not new in themselves. What is unique in this invention is the latching circuit 22 in conjunction with the combinational decision logic 23 and the holding signal provided by the latter at proper times via the terminal 29 to avoid a race between the signal applied to the input terminal 18 and signals applied to the terminals 19 and 20. Of course, in a more complex system, there can be more than one latching circuit and more than one holding signal output terminal 29.

Figure 4:
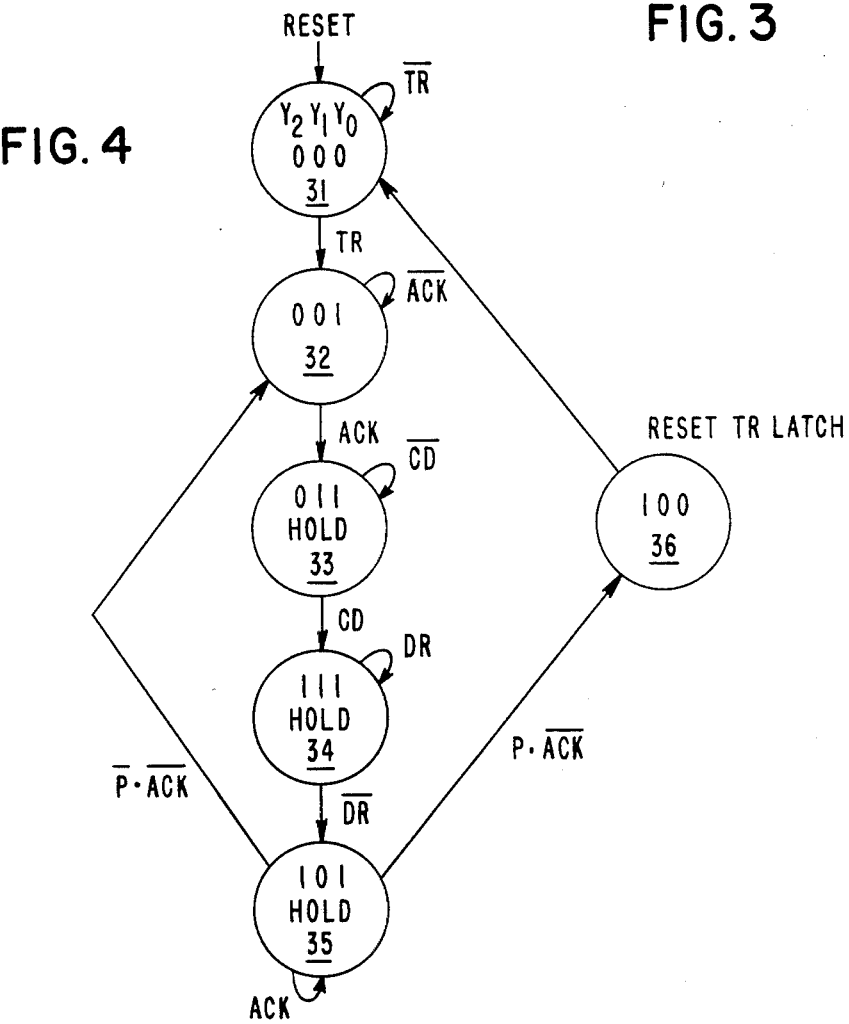
FIG. 4 is a state diagram of one embodiment of this invention.

FIG. 4 represents a more complex state machine that requires three digits (more are possible) to represent all of its states. The state diagram includes a first state 31 in which three state signals $Y_2$, $Y_1$, and $Y_0$ are each equal to 0, by definition. As long as a signal $\overline{TR}$ remains true or logic 1, the machine stays in the 000 state and only shifts to the state 32 when the signal $\overline{TR}$ becomes false or logic 0. The exact nature of the digital signal $\overline{TR}$ (and its converse TR) is immaterial to this invention, and neither it nor any of the other controlling signals need be described. In the state 32 the signal $Y_0 = 1$, so the state is represented as 001.

The machine remains in the 001 state until a signal $\overline{ACK}$ reverses polarity to become ACK. This shifts the machine to the next state 33 represented by state signals 011, or $Y_2 = 0$ and $Y_1 = Y_0 = 1$.

Reversal of a signal $\overline{CD}$ to CD causes the state to shift to the HOLD state 34. As in FIG. 2, the HOLD state precedes a state in which a race could take place. This is the state 35 and it is reached when a control signal DR reverses polarity to $\overline{DR}$. The state 34 is represented by state signals 111, but this fact, which symbolizes that $Y_2=Y_1=Y_0=1$ is not a necessary condition for latching. The latching state could be the state 35, which is represented by signals 101, corresponding to $Y_2=1$, $Y_1=0$, and $Y_0=1$. Or, in a larger system, the latching could be associated with a state represented by any other group of 0's and 1's. What is necessary is that the signal (which, so far has not been identified) be latched before it gets to the branching state, and in this embodiment, the branching state is state 35.

The machine remains in the state 35 until the signal ACK reverses polarity to become $\overline{ACK}$, and then the machine branches either to a state 36, having state condition 100, or loops back to state 32, having state condition 001. This means that if the state signal $Y_0$ shifts from 1 to 0, the machine shifts from state 35 to state 36. Alternatively, if the signal $Y_0$ remains 1 and the signal $Y_2$ shifts to 0, the state loops back to the state 32.

The latched signal that determines the direction of branching from the state 35 is the signal P. If it has been latched in the polarity represented as P, the transition will be to state 36, but if it has the reverse polarity $\overline{P}$, the transition will be back to the state 32.

While the polarity P or $\overline{P}$ determines the direction of branching, the transition cannot occur until the signal ACK has reversed to $\overline{ACK}$.

If the latched signal is P, the state transitions continue to remain in state 35 until the signal $\overline{ACK}$ becomes true (and ACK false), at which time the state branches to state 36. In this embodiment it happens that a TR latch (not shown) is reset, but any desired event could take place instead. It also happens that the machine proceeds directly from state 36 back to the initial state 31, but, again, any number of other states could be located in that path, including states that required further latching. The purpose of such latching would be analogous to the purpose of latching in the state 34.

FIGS. 5A–5D show Karnaugh maps representative of the operation of the state machine represented by the state diagram in FIG. 4. The top map FIG. 5A is a complete representation of the entire sequence of states in FIG. 4. The signal $Y_0$ is the first state signal to have its polarity reversed in going from the 000 condition in state 31 to the 001 condition in state 32, and that transition occurs because the signal TR becomes equal to 1 (according to the logic being used). The symbol TR thus appears alongside the arrow in the cell representing the state 31. Similarly the symbols ACK, CD, and $\overline{DR}$ appear alongside respective arrows in the cells 32-34. Transition from the cell 35 to the cell 36 takes place if P is true as represented by the arrow from the cell 35 to the cell 36. Otherwise, if $\overline{P}$ is true, the state machine loops back to the state 32, as indicated by the arrow $\overline{P}$.

FIG. 5B represents the conditions in which $Y_0=1$, as illustrated by the equation associated with that figure. The cell 35 is representative of two conditions: the condition in which the signal ACK is true and the state machine remains in the state 35 in which $Y_0=1$, and the condition in which $\overline{ACK}$ becomes true and $\overline{P}$ is also true, causing the machine to loop back to the state 32, where $Y_0$ remains at 1. The alternative branching to cell 36 requires that $Y_0$ become 0 and need not be represented in the equation in which $Y_0$ is 1.

The map in FIG. 5C represents the conditions in which $Y_1$ is 1, which is true only in cells 32-34.

The map in FIG. 5D represents the conditions in which the signal $Y_2$ is 1, which is true in cells 33-35. In the latter cell, $Y_2=1$ while ACK is true, like $Y_0$. Unlike $Y_0$, $Y_2$ remains 1 going to cell 36 when P and $\overline{ACK}$ are both true, as represented by the conjunction P·$\overline{ACK}$.

Figure 6B:
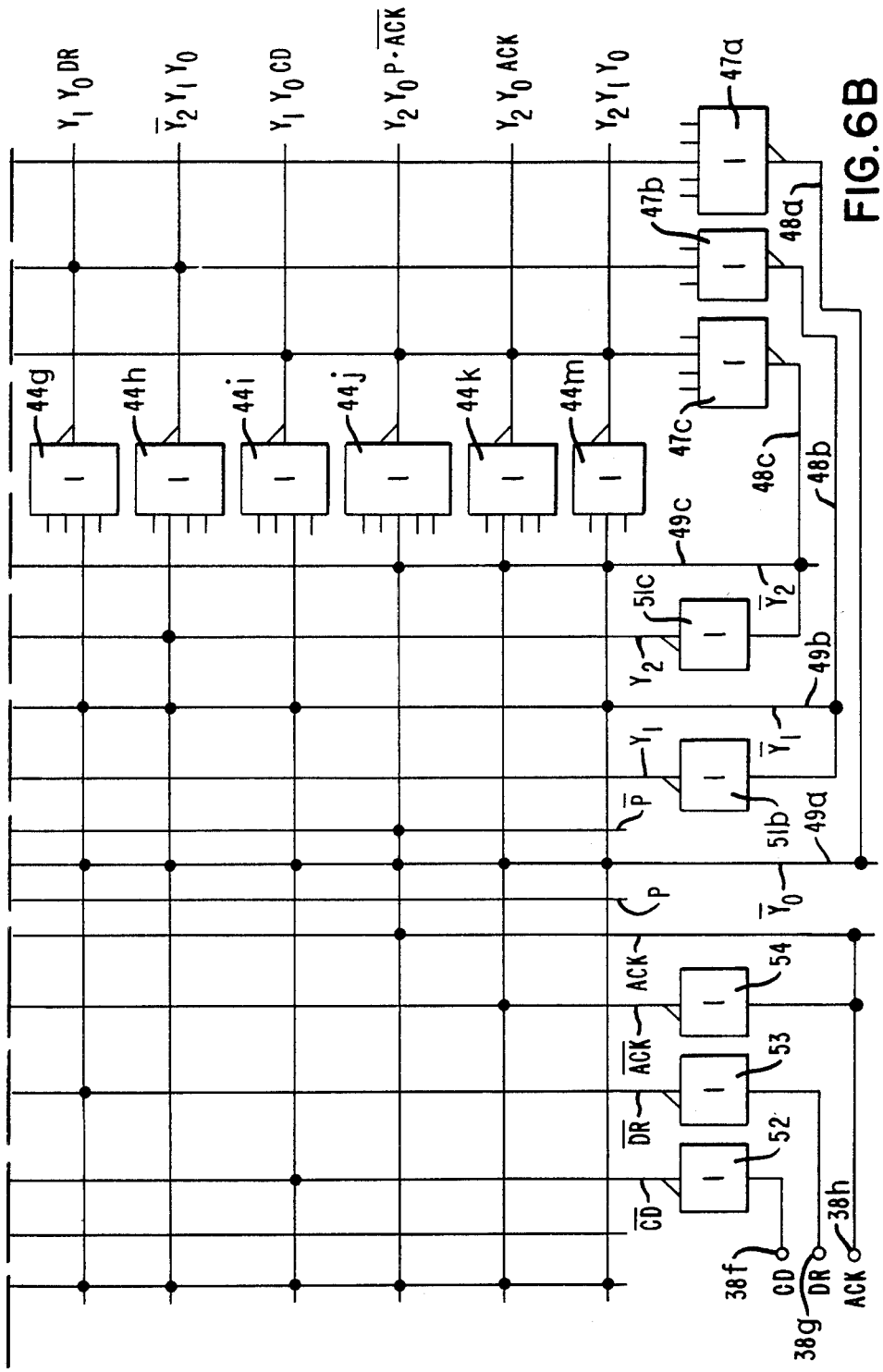

The circuit in FIG. 6 corresponds to the state diagram in FIG. 4 and the maps in FIG. 5. It includes a number of input terminals 38a–38h to which various asynchronous input signals are applied. The terminal 38a is connected to the data input terminal D of a transparent latch 39. The terminals 38b–38h are connected to a first set of logic gates. The terminals 38b and 38c are connected, in this embodiment, directly to input terminals of a NOR gate 41 while the terminals 38d–38h are connected to a grid 42 of connectors to which the output terminal of the gate 41 is also connected, both directly and through an inverter 43.

More specifically, the grid connectors to which the terminals 38b–38h and the output terminal of the NOR gate 41 are connected are illustrated as vertical lines in FIG. 6. These vertical lines are illustrated as apparently being connected in groups to single-input NOR gates 44a–44m. Actually, of course, each NOR gate has more than one input terminal. In fact, each NOR gate has at least as many input terminals as the number of dots on the respective horizontal line leading to it. Each terminal, such as the terminal 38e, is connected by a different horizontal line to each NOR gate, such as the NOR gate 44a than any of the other input terminals, which, in this instance is only the input terminal 38d. The input terminals are not simply short-circuited together, as the dots make them appear to be. Showing three or four separate horizontal lines to each NOR gate would make the drawing illegible.

The horizontal and vertical lines that constitute the grid 42 leading from the input terminals 38b–38h comprise a first circuit means operatively connecting these components to the first set of NOR gates 44a–44m. The Q output terminal of the latch 39 is connected via the NOR gate 41 to this first circuit means.

A second circuit means 46 consisting of a smaller grid connects output terminals of the NOR gates 44a–44m in sets, or groups, to input terminals of a second set of NOR gates 47a–47c. The same symbolism is used as in the first circuit means 42, i.e., there are actually five (vertical) lines connecting the five output terminals of the NOR gates 44a–44e to the five input terminals of the NOR gate 47a, three to the NOR gate 47b and four to the NOR gate 47c.

The output terminals of the NOR gates 47a–47c are connected by PRESENT STATE feedback lines 48a–48c to vertical lines 49a–49c in the first circuit 42. The feedback lines 48b and 48c are also connected through inverters 51b and 51c to other vertical wires in the grid 42. It happens that no inverter need be connected to the feedback line 48a, although grid 42 might include such an inverter as part of its hardware.

The input terminal 38f is connected through an inverter 52 to one of the vertical lines in the grid 42. The terminal 38g is also connected through another inverter 53 to a vertical line in the grid 42 and the terminal 38h is connected directly and through an inverter 54 to separate lines in the grid.

Another set of NOR gates 56a and 56b have their input terminals connected to the grid 42 and their output terminals connected to the input terminals of a NOR gate 57. The output terminal of the latter gate supplies the signal to control the holding, or latching, operation of the latch circuit 39 and is connected directly to a terminal C of the latch and, via an inverter 58, to a terminal $\overline{C}$.

The operation of the circuit in FIG. 6 will be described in conjunction with the state diagram in FIG. 4.

The circuit is placed in state 31 by causing the MR signal at the input terminal 38e to take the value 1. This signal is the correct signal to reset the latch 39 when applied to the reset input terminal R of the latch. The dots on the vertical line connected to the terminal 38e show that the MR = 1 signal is also applied to one input terminal of each of the NOR gates 44a–44m and the NOR gates 56a and 56b. The type of logic used in this circuit is such that, when any input terminal of a NOR gate has a 1 signal applied to it, the output terminal of that gate will go to 0, no matter whether a 1 or a 0 is applied to the other input terminals of the NOR gate. Thus the output terminal of each of the NOR gates 44a–44m goes to 0 as does the output terminal of each of the NOR gates 56a and 56b.

As a result, all of the input signals to every input terminal of each of the NOR gates 47a–47c receives a 0 signal and this is the only condition that causes the output terminals of these NOR gates to take on the value 1. The lines leading from those output terminals are identified as $\overline{Y}_0$, $\overline{Y}_1$, $\overline{Y}_2$, respectively, which means that, immediately following the MR = 1 signal, the output terminals of the NOR gates 47a–47c represent the converse of the state condition 000.

Similarly, the output terminal of the NOR gate 57 is driven to the value 1, in which condition the input signal PF applied to the latch 39 is not held constant, or latched.

The $\overline{Y}_0 = 1$ signal from the NOR gate 47a is connected, as indicated by dots on its vertical line, to all of the NOR gates 44b–44m and 56a and 56b. As a result, the output terminals of those NOR gates will be held at the value 0 even after the MR signal becomes false, i.e., is terminated, or changed to 0.

At this time, the only NOR gate 44 not locked into a 0 condition, that is, a condition in which it has a value of 0 on its output terminal, is the NOR gate 44a. As indicated in the state diagram in FIG. 4, the machine remains in the 000 state as long as the signal $\overline{TR}$ remains true, that is, at a value of 1. The other two input terminals of the NOR gate 44a have 0's applied to them from the $Y_2$ inverter 51c and the $Y_1$ inverter 51b (MR having been changed to 0, and so, as soon as the $\overline{TR}$ signal becomes false, that is, as soon as the signal applied to the input terminal 38d drops to the value 0, all of the input terminals of the NOR gate 44a will be receiving a 0. This is the condition that causes the NOR gate 44a to go to 1, thereby applying a 1 to one of the input terminals of the NOR gate 47a. As a result, the output terminal of the NOR gate 47a changes to 0. Since the status of the output terminal of the NOR gate 47a is the signal $\overline{Y}_0$ and corresponds to the converse of the state signal $Y_0$, and since the output signals $\overline{Y}_2 32 \overline{Y}_1 = 1$, the machine is now in the state 001. This is the state 32 in FIG. 4.

As soon as the $\overline{Y}_0$ signal goes to 0, all of the input terminals of the NOR gate 44b are at 0, and so its output terminal goes to 1.

As long as $\overline{ACK}$ remains true, the machine will stay in state 32 represented by the state signals 001. When ACK becomes true, all of the input signals, which are MR $\overline{ACK}$, $\overline{Y}_0$, and $Y_2$, to the NOR gate 44f are 0 and the output signal from that NOR gate to the NOR gate 47b changes to 1. This causes the output signal $\overline{Y}_1$ of the latter NOR gate to change to 0, so that the state signals $Y_2Y_1Y_0$ are now 011. As shown in FIG. 4, that is the proper condition for state 33.

When the output signal $\overline{Y}_1$ of the NOR gate 47b becomes 0 while the signal $Y_2$ from the inverter 51c is still 0, the output signal of the NOR gate 44h also becomes 1, as does the output signal of the NOR gate 44g, if the signal $\overline{DR}$ is 0. These conditions are consistent with the fact that the state signals are 011.

As long as the signal $\overline{CD}$ remains 1, the machine will stay in that state, but when the signal $\overline{CD}$ becomes 0, the output signal of the NOR gate 44i goes to 1, and the output signal $\overline{Y}_2$ of the NOR gate 47c goes to 0. This is consistent with the condition in state 34 in FIG. 4 in which the state signals $Y_2Y_1Y_0$ are 111.

The NOR gates 56a and 56b are controlled by the signals $\overline{Y}_0$, $\overline{Y}_1$, and $\overline{Y}_2$, and for the first time, all of the input signals to both of these NOR gates are 0. This allows their output signals to shift to 1 and causes the output signal of the HOLD NOR gate 57 to go to 0 and latch the signal PF applied to the transparent latch 39. The latched signal (together with the signals PE and TCM) causes the output signal of the NOR gate 41 to be either 1 or 0. When the machine is in state 34 due to state signals 111, it does not matter what the output signal of the NOR gate 41 is.

The machine remains in state 34 until the $\overline{DR}$ signal becomes true, i.e., becomes 1. That causes the output signal of the NOR gate 44g to go to 0, and since the output signals of the NOR gates 44f and 44h are already 0, all of the input signals to the NOR gate 47b are 0, allowing its output signal $\overline{Y}_1$ to go to 1. This corresponds to state signals 101, as required when the machine is in state 35.

The input signal $\overline{Y}_1$ to the NOR gate 56a shifts to 1, which makes the output signal of that NOR gate 0, but since the input conditions to the NOR gate 56b have not changed, its output signal is still 1, and the output signal of the HOLD NOR gate 57 is still 0.

The $\overline{ACK}$ signal is 0, but as soon as it becomes 1, the machine is ready to shift out of state 35. It is at this point that the condition of the latched signal PF becomes important. If the output signal of the latch 39 is 1, the output signal $\overline{P}$ of the NOR gate 41 will be 0 and the output signal P of the inverter 53 will be 1. Thus, having $\overline{ACK}$ become 1 causes the output signal of the NOR gate 44d to go to 0. Since this is the only NOR gate that was applying a 1 signal to the NOR gate 47a, the latter NOR gate is able to change states so that its output signal goes from 0 to 1.

The fact that the ACK signal applied to the NOR gate 44e goes from 1 to 0 has no effect because the condition being examined is one in which the P signal applied to the NOR gate 44e is 1 and maintains the output signal of that NOR gate at 0.

The output signals of both of the NOR gates 47a and 47b are now 1, corresponding to state signals 100, as required for entry to state 36. In this state the output signal $\overline{Y}_0$ of the NOR gate is changed to 1, which causes the output signals of all of the NOR gates 44b–44m, as well as NOR gates 56a and 56b, to go to 0. The NOR gate 44a receives a 1 signal from the inverter 51c so all of the input signals to the NOR gates 47a–47c are at 0. This shifts the machine back to state 31 in which all of the state signals $Y_2Y_1Y_0$ are 000.

The output signals of both of the NOR gates 56a and 56b are 1, causing the output signal of the HOLD NOR gate 57 to return to 0 to release the latch 30 to follow any variation in the signal PF until it is latched again.

Going back to state 35, if the signal P has been latched at 0 and $\overline{P}$ at 1, the subsequent change of the $\overline{ACK}$ from 0 to 1 causes the last input signal to the NOR gate 44k to go from 0 to 1, driving the output signal of that NOR gate to 0. When the signal $\overline{P}$ is at 1, the output of the NOR gate 44j is forced to 0, and the combined effect of having the signals P and ACK both at 0 is that the output of the NOR gate 44e will be 1. All of the other NOR gates 44i, 44k, and 44m already have output signals of 0, so the conditions required to change the output signal of the NOR gate 47c from 1 to 0 are fulfilled. This makes the state signals $Y_2 Y_1 Y_0$ equal to 001, which places the machine back in state 32. It also releases the HOLD NOR gate 57. The machine is free to loop around states 32-35 until, at the time it enters the state 34, the signal P is latched in the true, or 1, state before the signal $\overline{ACK}$ goes true.

The horizontal lines of the grid 46 have been labeled with the signals applied to the respective NOR gates 44a-44m, as indicated by the dots. It will be noted that the labels for the lines from the NOR gates 44a-44e, which control the NOR gate 47a and thus the state signal $Y_0$, are the same elements that make $Y_0=1$ in the equation under the Karnaugh map in FIG. 5B. In the same way, the labels for the signals to the NOR gates 44f-44h correspond to the terms on the right hand side of the equation for $Y_1$ and the labels for the NOR gates 44i-44m correspond to the terms on the right hand side of the equation for $Y_2$.

I claim:

1. A stabilization system for an asynchronous state machine, said stabilization system comprising:
   a combinational decision logic circuit having a plurality of input terminals for receiving digital signals, a selected one of said input terminals for receiving an asynchronous digital signal whose state is stabilized, a plurality of feedback signal input terminals, a plurality of feedback output terminals for providing signals representative of a present state of said combinatinal decision logic circuit, said state being dependent on the state and sequence of said digital signals received on said input terminals, and holding signal output means for providing a holding signal dependent on the state of said combinational decision logic circuit;
   a first circuit connecting said feedback output terminals to said feedback signal input terminals for feeding back present state information of said combinational decision logic circuit;
   latching means having an input for receiving a selected asynchronous digital signal and an output connected to said selected one of said input terminals;
   and a second circuit connected between said holding signal output means and said latching means for controlling said latching means whereby said selected asynchronous digital signal is transmitted to said selected one of said input terminals only upon predetermined state conditions of said combinational decision logic circuit.

2. The systems of claim 1 in which the latching means comprises a transparent latch.

3. The system of claim 2 in which the combinational decision logic circuit comprises a first plurality of NOR gates, each having a plurality of input terminals selectively operatively connected to selected ones of said input terminals and to the first circuit to be controlled by selective combinations of the digital signals and present state feedback signals to control transition of the combinational decision logic circuit from state to state.

4. The system of claim 3 in which the combinational decision logic circuit comprises a second plurality of NOR gates having input terminals connected in groups to the output terminals of the first plurality of NOR gates to be controlled by output signals therefrom, the second plurality of NOR gates having output terminals comprising said feedback output terminals.

5. The system of claim 1 in which the combinational decision logic circuit comprises NOR gate means having input terminals selectively operatively connected to the feedback output terminals to be controlled by the feedback output signals and having output terminal means operatively connected to the holding signal output means.

6. The system of claim 5 in which the NOR gate means comprises first and second NOR gates having said input terminals and each having an output terminal, and a third NOR gate having input terminals connected to the output terminals of the first and second NOR gates and having an output terminal comprising the holding signal output means.

7. A stabilization system for an asynchronous state machine, said stabilization system comprising:
   a plurality of asynchronous digital signal terminals to receive asynchronous digital signals;
   transparent latching means comprising:
      (i) a data input terminal operatively connected to a first one of the digital signal input terminals to receive a first one of the digital signals,
      (ii) a data output terminal, and
      (iii) a control signal terminal;
   first gate means comprising a plurality of input terminals and a plurality of output terminals;
   second gate means comprising a plurality of input terminals and a plurality of state output terminals to supply state signals, each of the output terminals of the first gate means being operatively connected to selected input terminals of the second gate means;
   first circuit means operatively connecting the data output terminal of the latching means to a first one of the input terminals of at least first and second gates of the first gating means to apply output signals from the latching means thereto in predetermined relative polarity;
   second circuit means operatively connecting one of the asynchronous digital signals to a second one of the input terminals of the first and second gates and to input terminals of third and fourth gates of said first gate means to apply said one of said asynchronous signals thereto in predetermined relative polarity, whereby the first gate is active only when the output signal from the latching means applied to the first gate has one effective polarity relative to said one of said asynchronous signals applied to said first gate and the second gate is active only when the output signal of the latching means applied to the second gate has an effective polarity opposite said one effective polarity relative to said one of said asynchronous signals applied to said second gate;

third circuit means operatively connecting the output terminals of the first and third gates of the first gate means to an input terminal of a first gate of the second gate means and operatively connecting the output terminals of the second and fourth gates of the first gate means to an input terminal of a second gate of the second gate means; and holding means operatively connected to the output terminals of the second gate means to be actuated by the state signals therefrom to allow the first one of the digital signals to pass through the latching means under certain states and to hold the one digital signal latched under other states.

* * * * *